(12) United States Patent
Ohba

(10) Patent No.: US 7,079,833 B2
(45) Date of Patent: Jul. 18, 2006

(54) MOBILE RADIO TERMINAL AND NETWORK COMMERCE SYSTEM USING THE SAME

(75) Inventor: Akitomo Ohba, Tokyo (JP)

(73) Assignee: NEC Corporation (JP)

( * ) Notice: Subject to any disclaimer, the term of this patent is extended or adjusted under 35 U.S.C. 154(b) by 431 days.

(21) Appl. No.: 10/135,564

(22) Filed: May 1, 2002

(65) Prior Publication Data

US 2002/0168961 A1    Nov. 14, 2002

(30) Foreign Application Priority Data

May 10, 2001    (JP) ............................. 2001-140550

(51) Int. Cl.
*H04M 1/66* (2006.01)
(52) U.S. Cl. ..................................... 455/410
(58) Field of Classification Search ............... 382/107, 382/124, 127; 235/282; 345/700; 455/410
See application file for complete search history.

(56) References Cited

U.S. PATENT DOCUMENTS

| | | |
|---|---|---|
| 5,848,231 A | 12/1998 | Teitelbaum et al. |
| 6,104,922 A | 8/2000 | Baumann |
| 6,298,230 B1 | 10/2001 | Schneider-Hufschmidt |
| 6,665,427 B1 * | 12/2003 | Keagy et al. ............... 382/124 |
| 2001/0017934 A1 * | 8/2001 | Paloniemi et al. .......... 382/107 |

FOREIGN PATENT DOCUMENTS

| | | |
|---|---|---|
| EP | 0 924 948 A1 | 6/1999 |
| FR | 2674 051 | 9/1992 |
| JP | 10-51441 | 2/1998 |
| JP | 11-146057 | 5/1999 |
| JP | 2971620 | 8/1999 |
| JP | 11-262059 | 9/1999 |
| JP | 2000-69154 | 3/2000 |
| JP | 2000-165378 | 6/2000 |

OTHER PUBLICATIONS

UK Search Reported dated Sep. 27, 2002.

* cited by examiner

*Primary Examiner*—Joseph Feild
*Assistant Examiner*—Wayne Cai
(74) *Attorney, Agent, or Firm*—Dickstein, Shapiro, Morin & Oshinsky, LLP.

(57) ABSTRACT

A mobile radio terminal comprises a key which has a fingerprint detecting function and operates to input an instruction in correspondence with a pushing position, a memory for registering a fingerprint detected by the key, a fingerprint collating portion for collating the fingerprint registered in the memory with a fingerprint which is newly detected by the key, and a CPU and branch portion for switching to allow the input of the instruction from the key only when it is judged through the fingerprint collation that the fingerprint newly detected is coincident with any one of the fingerprints registered in the memory.

5 Claims, 5 Drawing Sheets

MOBILE RADIO TERMINAL AND NETWORK COMMERCE SYSTEM USING THE SAME

BACKGROUND OF THE INVENTION

1. Field of the Invention

The present invention relates to a mobile radio terminal and a network commerce system using the mobile radio terminal and particularly, to a mobile radio terminal having a fingerprint sensor and a network commerce system using the mobile radio terminal.

2. Description of the Prior Art

Various kinds of functions have been rapidly provided to a mobile radio terminal such as a cellular phone or the like, and it is expected that goods will be purchased or a payment for the goods thus purchased will be made through electric commerce (electronic business transactions) using a cellular phone or the like. Therefore, each mobile radio terminal is required to have a function of specifying a purchaser of goods or the like so that goods can be prevented from being purchased in business transactions with a mischievous prank or by using a stolen cellular phone or the like, or a function of authenticating a person who makes a payment by using a cellular phone.

A cellular phone is generally provided with a function of invalidating input of numerical keys or the like (hereinafter referred to as "key lock"), and the key lock is set/released by inputting a password which is registered in advance.

FIG. 1 is a block diagram showing a fingerprint authenticating device described in Japanese Laid-open Patent Publication No. 2000-165378 (JP 2000-165378 A).

The fingerprint authenticating device shown in FIG. 1 is mounted in a mobile radio terminal, and fingerprint reading portion 101 is provided to power source switch 100 of the mobile radio terminal. When the power source switch 100 is pressed, fingerprint authentication is carried out in fingerprint authentication portion 120. If the fingerprint of a user is coincident with a fingerprint registered in fingerprint registering portion 110, the mobile radio terminal is operated by operation controller 160. Further, on the basis of the authentication result output from the fingerprint authentication portion 120, user identification is carried out on user identifying portion 180.

The fingerprint authenticating device is further provided with a voiceprint authenticating function. In a voiceprint authenticating portion 150, a voiceprint of a voice input through microphone 130 is collated with a voiceprint registered in voiceprint registering portion 140, and if the voiceprint in the voiceprint registering portion 140 is coincident with the voiceprint from microphone 130, the mobile radio terminal is allowed to make a telephone call. When a fixed predetermined time elapses from the start of the telephone call, the power source of the mobile radio terminal is turned out by timer portion 170. Accordingly, even when the mobile radio terminal is lost or stolen while it is under operation, unauthorized use of the mobile radio terminal can be prevented.

According to this device, by only a simple operation such as an operation of pushing the power source switch 100, the fingerprint can be authenticated and the security of the mobile radio terminal can be enhanced. Further, if a multistage key is used as a telephone call key, the fingerprint authentication and occurrence of a random number could be carried out by half-pushing while the telephone call is allowed by full-pushing.

In the above prior art, the fingerprint reading portion (hereinafter referred to as "fingerprint sensor") of the power source switch is provided, however, when the power source switch is designed in a compact size in connection with miniaturization of the mobile radio terminal, there occurs a case where sufficient fingerprint authentication cannot be performed. Specifically, it is required to set the size of the fingerprint sensor so that a finger is substantially perfectly put on the fingerprint sensor to detect the fingerprint precisely, and in order to satisfy this requirement, the size of the fingerprint sensor is estimated to be equal to at least about 15 mm square (millimeters square).

SUMMARY OF THE INVENTION

Therefore, an object of the present invention is to enable precise authentication of a fingerprint even when keys mounted in a mobile radio terminal such as a cellular phone or the like are designed in compact size in connection with miniaturization of the mobile radio terminal.

In order to attain the above object, according to a first aspect of the present invention, there is provided a mobile radio terminal comprising a key which has a fingerprint detecting function and operates to input an instruction in correspondence with a push position, a memory for registering a fingerprint detected by the key, a fingerprint collating portion for collating the fingerprint registered in the memory with a fingerprint which is newly detected by the key, and a switching portion for switching to allow the input of the instruction from the key only when it is judged through the fingerprint collation that the fingerprint newly detected is coincident with the fingerprint registered in the memory.

In order to attain the above object, according to a second aspect of the present invention, there is provided a network commerce system comprising the above mobile radio terminal, a supply terminal which is handled by a supplier for supplying goods or services to a user of the mobile radio terminal, and a network for connecting the supply terminal and the mobile radio terminal therethrough, wherein the supply terminal comprises registering means for registering a fingerprint of the user, request means for requesting the mobile radio terminal to transmit a fingerprint as a reply through the network, reception means for receiving the fingerprint transmitted from the mobile radio terminal through the network in response to the request of the request means, and collating means for collating the fingerprint received by the reception means with the fingerprint registered in the registering means, the goods or services being supplied on the basis of the collation result of the collating means.

DETAILED DESCRIPTION OF THE PREFERRED EMBODIMENTS

Preferred embodiments according to the present invention will be described hereunder with reference to the accompanying drawings.

[Description of Construction]

Figure 1:
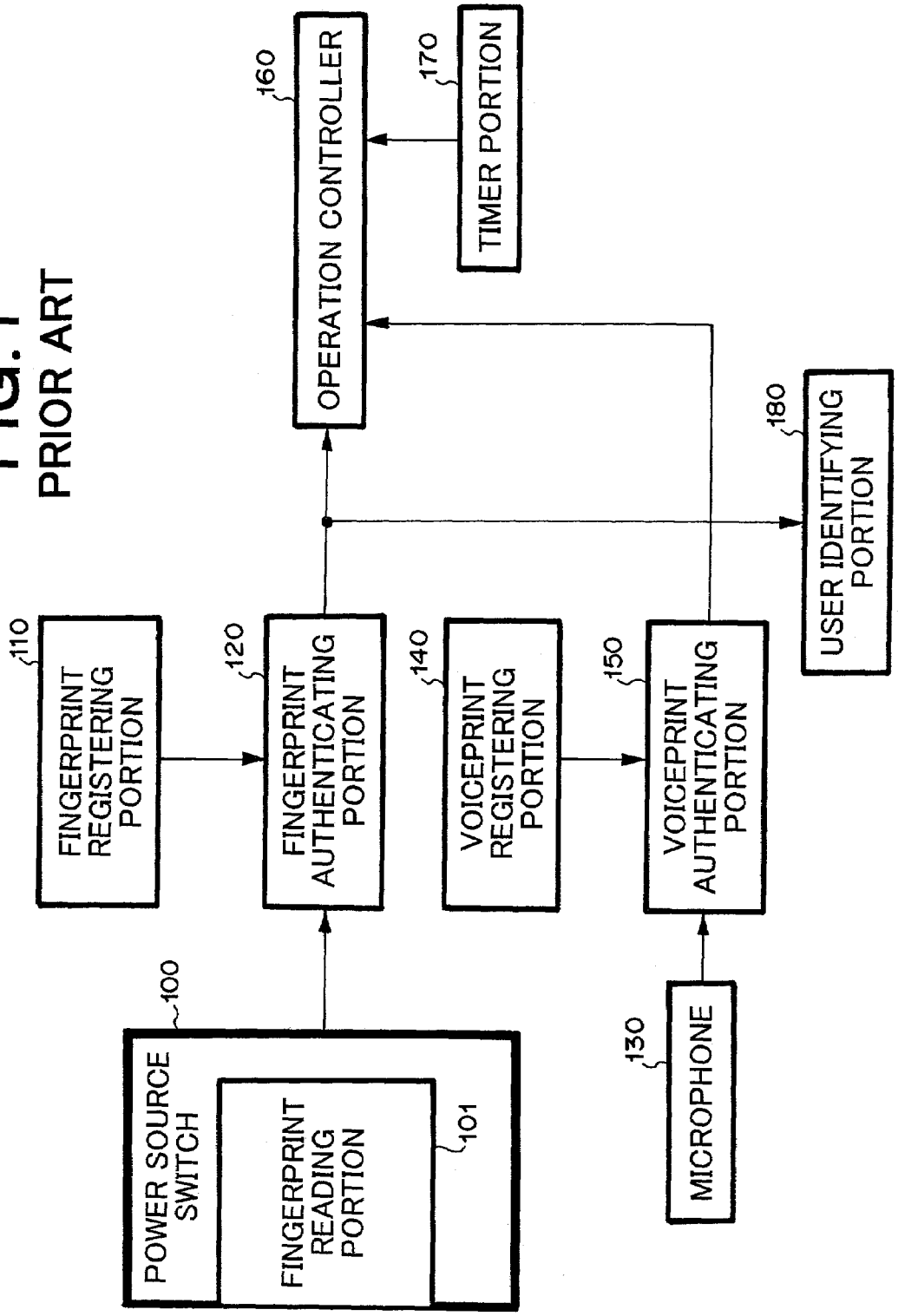
FIG. 1 is a block diagram of a conventional fingerprint authenticating device.
Figure 2:
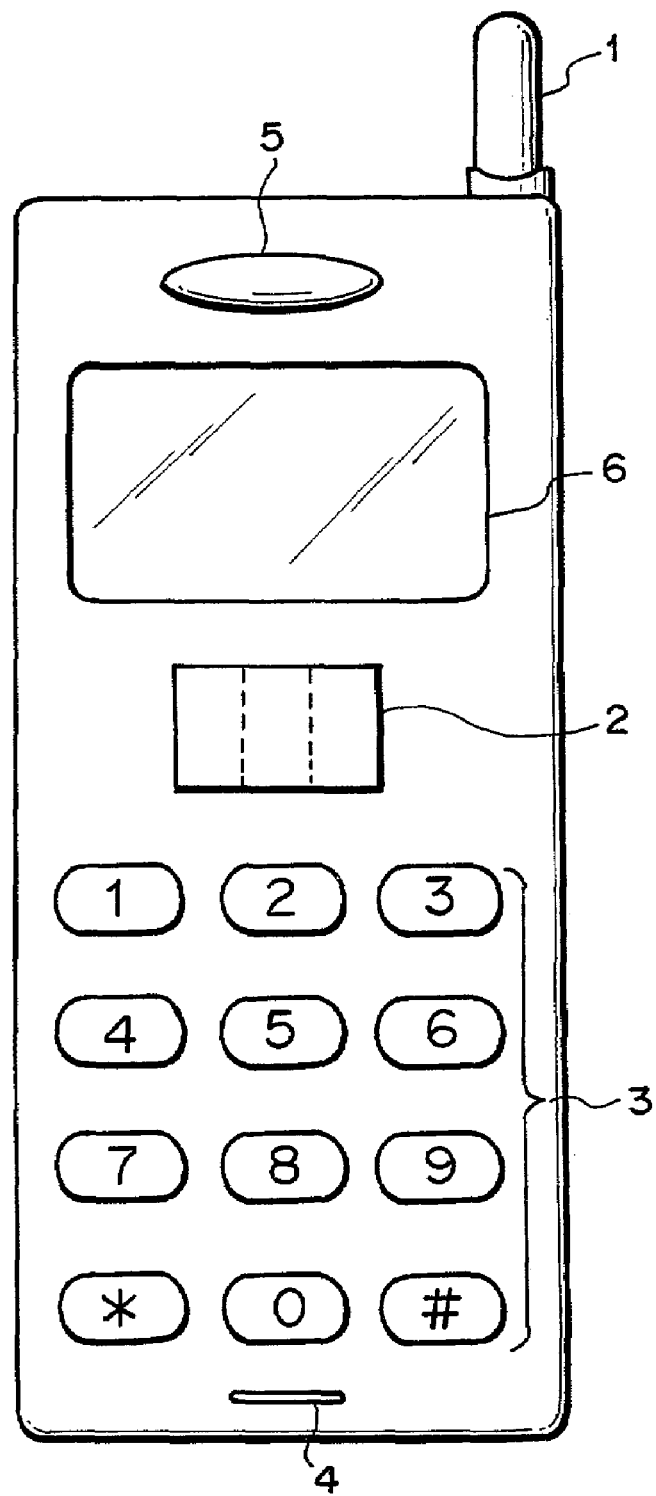
FIG. 2 is a schematic view showing the outlook of a cellular phone according to an embodiment of the present invention.

FIG. 2 is a diagram showing the outlook of a cellular phone according to an embodiment of the present invention.

The cellular phone shown in FIG. 2 has antenna 1 for receiving/transmitting electric waves from/to a base station, key 2 having a fingerprint sensor function (a fingerprint detecting function) and operating to input an instruction for originating a call and disconnecting the call, numerical keys 3 for inputting a telephone number and scrolling the display content on display portion 6, microphone 4 for collecting voices of a user particularly during a telephone call, speaker 5 for outputting voices of a telephone partner particularly during a telephone call, and display portion 6 for displaying data and hour, telephone number, instructions for electronic commerce, or the like. The key 2 will be referred as fingerprint sensor 2 when it is used as the fingerprint sensor.

Figure 3:
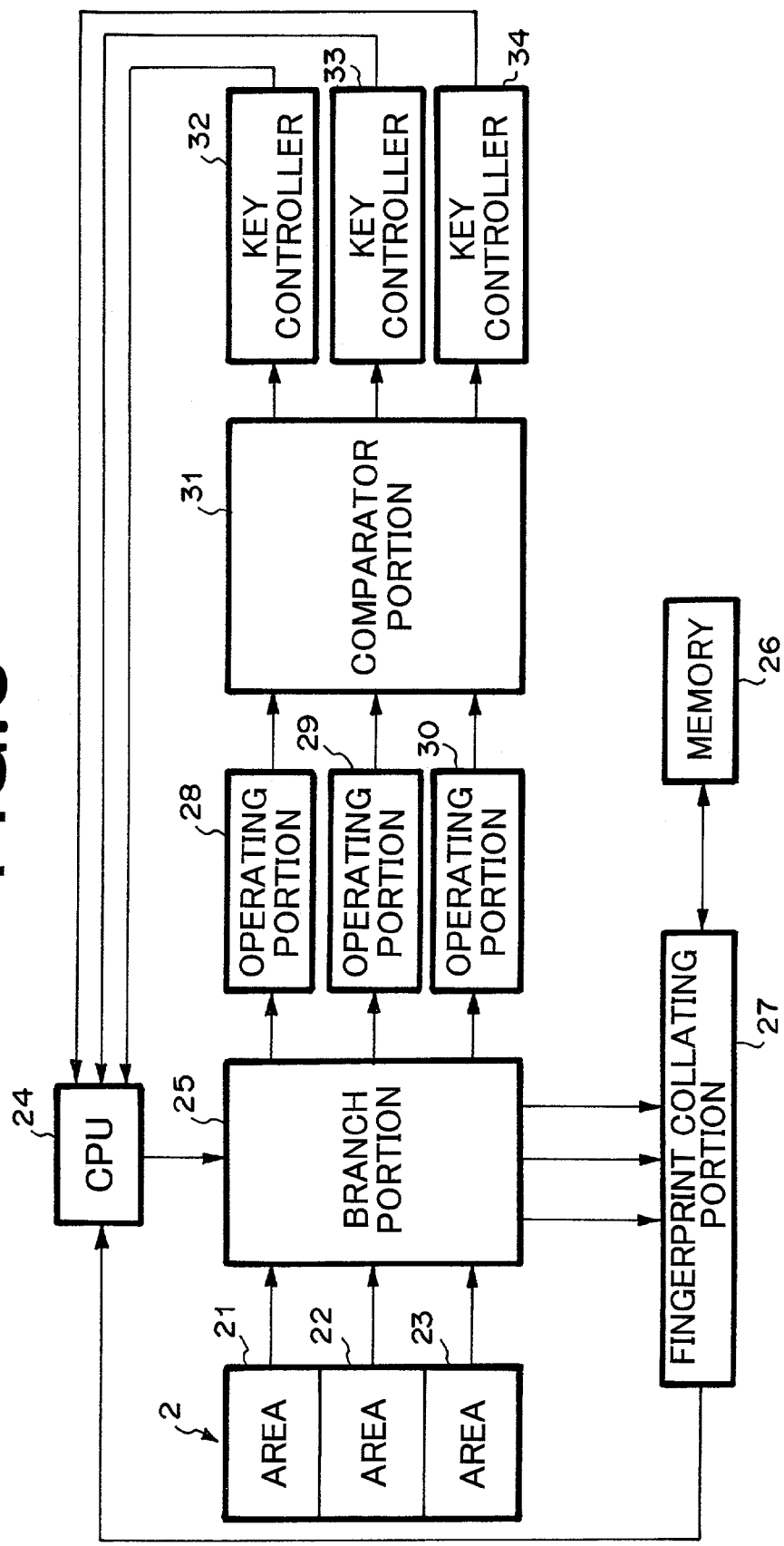
FIG. 3 is a block diagram showing the internal construction of FIG. 2.

FIG. 3 is a schematic block diagram showing the internal construction of a fingerprint authenticating device equipped in the cellular phone shown in FIG. 2.

As shown in FIG. 3, the fingerprint authenticating device has fingerprint sensor 2 having areas 21 to 23 each of which has plural cells arranged two-dimensionally, branch portion 25 for outputting the output from the fingerprint sensor 2 to fingerprint collating portion 27 or operating portions 28 to 30 on the basis of the setting of CPU 24, memory 26 for registering the fingerprint of a user of the cellular phone or the like in advance, the fingerprint collating portion 27 for collating a signal (fingerprint) output from the fingerprint sensor 2 with the fingerprint registered in the memory 26, the operating portions 28 to 30 for calculating the sum of cell signals output from the respective cells arranged in each of the areas 21 to 23, comparator portion 31 for comparing the outputs of the operating portions 28 to 30, key control portions 32 to 34 which are provided in correspondence to the areas 21 to 23 respectively and output on the basis of the comparison result of the comparator portion 31 a signal indicating that the areas 21 to 23 are pushed, and the CPU 24 for generating various control signals on the basis of the outputs of the key control portions 32 to 34 or the output of the fingerprint collating portion 27.

The cells correspond to minute sensor pixels which are arranged at a pitch of 50 to 100 μm. A switching portion is constructed by the CPU 24 and the branch portion 25, and a detector is constructed by the operating portions 28 to 30 and the comparator portion 31.

Figure 4:
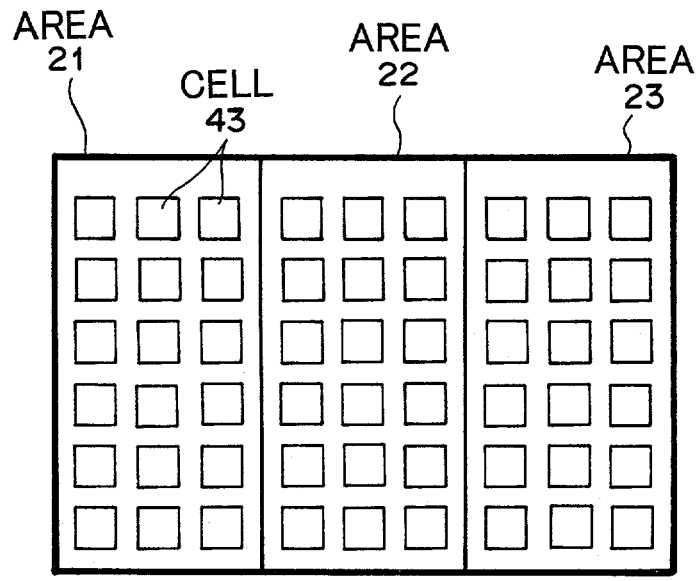
FIG. 4 is an enlarged view of areas 21 to 23 of FIG. 3.

FIG. 4 is an enlarged view showing the areas 21 to 23 of FIG. 3, and it shows the two-dimensional arrangement of the cells 43. The respective areas 21 to 23 may be comparted by physically drawing a line therebetween, or they may not be comparted, however, when they are used as the fingerprint sensor 2, the fingerprint collation is carried out by using signals output from all the areas 21 to 23.

When each of the areas 21 to 23 is used as the key 2 for inputting an instruction for originating a call and disconnecting the call, the input instruction is identified on the basis of the cell signal output from the cells 43 arranged in each of the areas 21 to 23.

Figure 5:
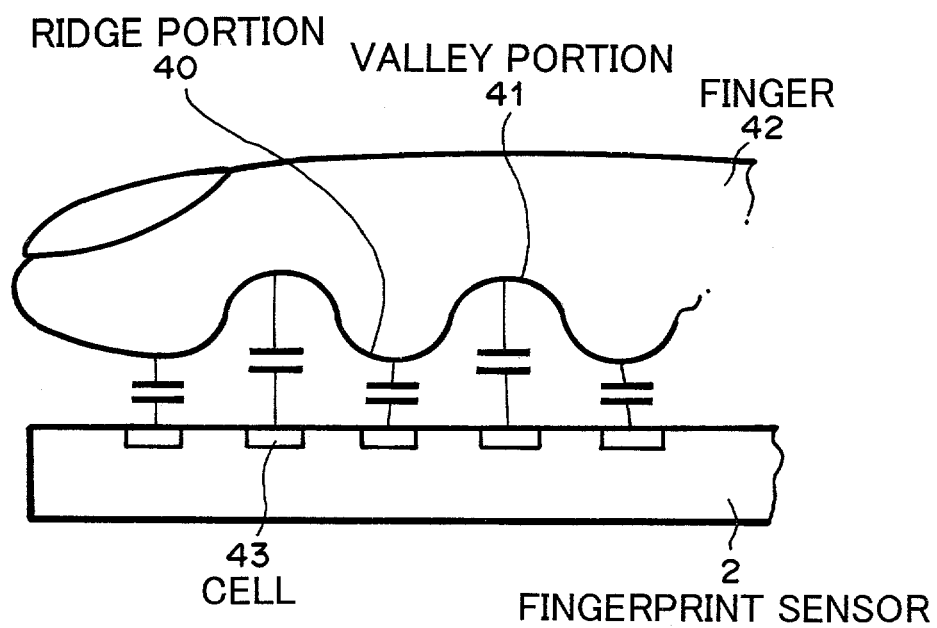
FIG. 5 is a cross-sectional view of FIG. 4.

FIG. 5 is a cross-sectional view of FIG. 4, and shows a state that a user puts his/her finger 42 on the fingerprint sensor 2. The finger 42 has ridge portions 40 at which the fingerprint is upheaved, and valley (recess) portions 41 at which the fingerprint is not upheaved. When the user puts the finger 42 on the fingerprint sensor 2, each cell 43 detects uneven portions of the fingerprint according to a so-called electrostatic capacity method or the like.

That is, as shown in FIG. 5, the distance to each cell 43 and the area are different between each ridge portion 40 and each valley portion 41, and thus the electrostatic capacity is different between them. Therefore, the uneven portions of the fingerprint is detected on the basis of the difference in electrostatic capacity. A pressure type, an optical type or other types may be used as the fingerprint sensor 2.

According to the pressure type fingerprint sensor, a piezoelectric material or the like is covered on the surface of a board, and when the finger 42 is put on the fingerprint sensor 2, only the ridge portions 40 are brought into contact with the piezoelectric material or the like, so that the fingerprint can be detected on the basis of resistance variation below the piezoelectric material portion which is brought into contact with the ridge portions 40. Further, according to the optical type fingerprint sensor, a light emitting element is provided to a board, and when a user puts his/her finger on the fingerprint sensor 2, light is irradiated from the light emitting element to the finger and the fingerprint is detected on the basis of the reflection angle of light which corresponds to an uneven portion of the fingerprint.

[Description of Operation]

Next, the operation of the cellular phone according to the embodiment will be described. In the following description, it is assumed that the respective areas 21 to 23 are provided with a function serving as "call key" pushed when a telephone call is started, a function serving as "off key" pushed when a telephone call is finished, and a function serving as "function key" pushed when the key lock is set and released, respectively. Further, the cellular phone is equipped with a menu for enabling "registration of fingerprint", "putting finger on fingerprint sensor", "electronic commerce", etc., and for example, the numerical keys are set so that the numerical keys "4", "6", "2", "8" are used to scroll the display content leftwardly/rightwardly and upwardly/downwardly, respectively.

First, when the user of the cellular phone shown in FIG. 2 pushes, for example, the area 23 under the state that the power source of the cellular phone is turned on, various menus are displayed on the display portion 6. Subsequently, when a desired key is selected from various menus displayed on the display portion 6 and pushed to select and determine a menu indicating "registration of fingerprint", the CPU 24 sets the display portion 6 to display a message "please put your finger on fingerprint sensor".

When the user puts his/her finger on the fingerprint sensor 2 in response to the instruction, the respective cells arranged in the areas 21 to 23 output corresponding signals. The signals output from the respective areas 21 to 23 are input to the branch portion 25 and then output to the fingerprint collating portion 27. In other words, when the fingerprint is registered, the CPU 24 sets the branch portion 25 so that the input signal to the branch portion 25 is output to the fingerprint collating portion 27.

Figure 7A:
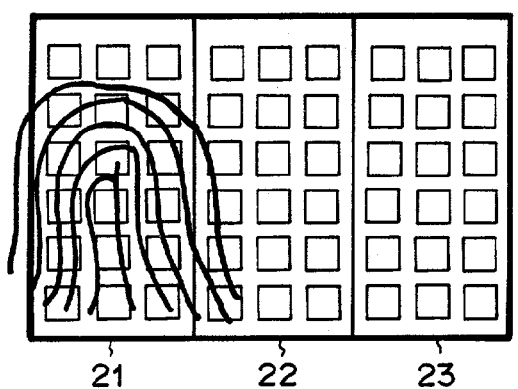
FIGS. 7A and 7B are diagrams showing a fingerprint recognized by the fingerprint sensor when a finger is put at the center of the area 21 or 23 of FIG. 4.
Figure 7B:
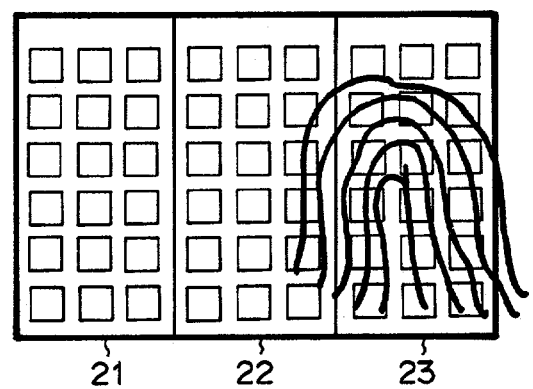

Subsequently, the fingerprint collating portion 27 passes the signals output from the branch portion 25 therethrough to the memory 26 to register the signals into the memory 26. For example, when the finger of the user is brought into contact with only the areas 21 and 22 as shown in FIG. 7A or when the finger is brought into contact with only the areas 22 and 23 as shown in FIG. 7B, a message "please move your finger to the center portion of the fingerprint sensor" is displayed on the display portion 6 to increase the information amount on the fingerprint used when the fingerprint collation is carried out and thus keep the reliability of the fingerprint collation.

According to the procedure described above, the fingerprint of the user of the cellular phone is registered in the memory 26. Subsequently, the memory 26 outputs to the CPU 24 a signal indicating that the registration is completed. At this time, the CPU 24 sets the branch portion 25 so that the input signal to the branch portion 25 is output to the operating portions 28 to 30.

Next, the operation of setting and releasing the key lock will be described.

In the case of the setting of the key lock, for example when a user pushes the area 23 under the state that the cellular phone shown in FIG. 2 is under no-calling state, various menus are displayed on the display portion 6. Subsequently, when the user pushes a desired key to select and determine a menu relating to the key lock from the various menus, the CPU 24 sets the display portion 6 to display a message "please put your finger on fingerprint sensor", for example. The CPU 24 sets the branch portion 25 so that an input signal to the branch portion 25 is output to the fingerprint collating portion 27.

When the user puts his/her finger on the fingerprint sensor 2 in response to the instruction displayed on the display portion 6, signals are output from the areas 21 to 23. The signals output from the respective areas 21 to 23 are input to the branch portion 26, and output to the fingerprint collating portion 27. Subsequently, the fingerprint collating portion 27 refers to the fingerprint of the user registered in the memory 26 with the input of the signal from the branch portion 25 as a trigger, and carries out the fingerprint collation.

When the finger of the user is brought into contact with only the areas 21 and 22 as shown in FIG. 7A or when the finger of the user is brought into contact with only the areas 22 and 23 as shown in FIG. 7B, a message "please move your finger to the center portion of the fingerprint sensor" is displayed on the display portion 6 to enable the fingerprint collation.

The result of the fingerprint collation is transmitted to the CPU 24. When receiving a collation result indicating that the fingerprint detected by the fingerprint sensor 2 for the fingerprint collation is coincident with the fingerprint registered in the memory 26, the CPU 24 displays, for example, a picture having a key shape on the display portion 6.

On the other hand, when receiving a collation result indicating that the fingerprint detected by the fingerprint sensor 2 for the fingerprint collation is not coincident with the fingerprint registered in the memory 26, a message "fingerprint collation failed" is displayed on the display portion 26, for example. Further, the CPU 24 sets the branch portion 25 so that the input signal to the branch portion 25 is output to the operating portions 28 to 30, and the setting of the key lock is finished.

Further, in the case of the release of the key lock, for example when the user pushes the area 23 to select and determine the menu on the key lock from the various menus displayed on the display portion 6 under the state that the user does not make a telephone call through the cellular phone shown in FIG. 2, a message "please put your finger on fingerprint sensor" is displayed on the display portion 6, for example, and the branch portion 25 is set to output the input signal thereto to the fingerprint collating portion 27.

When the user puts his/her finger on the fingerprint sensor 2 in response to an instruction displayed on the display portion 6, the fingerprint collation is carried out according to the same procedure as key lock setting. Only when receiving a collation result indicating that the fingerprint registered in the memory 26 is coincident with the fingerprint detected by the fingerprint sensor 2 for the fingerprint collation, the CPU 24 deletes the picture having the key shape displayed on the display portion 6.

On the other hand, when receiving a collation result indicating that the fingerprint detected by the fingerprint sensor 2 for the fingerprint collation is not coincident with the fingerprint registered in the memory 26, the CPU 24 displays a message "fingerprint collation failed" on the display portion 26, for example. Further, the CPU 24 sets the branch portion 25 to output the input signal thereto to the operating portions 28 to 30, and the key lock setting is released.

The procedure of the setting and release of the key lock has been described above. The fingerprint collation may be carried out in the same procedure as the setting and release of the key lock for the setting and release of various functions generally provided to the cellular phone such as setting and release of inhibition of telephone call, setting and release of inhibition of call and deletion of a telephone number registered.

Next, the operation when the key 2 is used as the key for inputting an instruction for originating a call and disconnecting the call will be described. For convenience's sake of description, an arrangement of piezoelectric elements for detecting only the presence or absence of "push" is shown in place of the arrangement of the cells in the areas 21 to 23.

As described above, after the fingerprint collation, the branch portion 25 is set so as to output the input signal thereto to the operating portions 28 to 30. Therefore, the signal output from each of the areas 21 to 23 when the user pushes any of the areas 21 to 23 is output to the operating portions 28 to 30. Therefore, for example when the user pushes the area 21 in the style as shown in FIG. 7A, a signal is output from the area 21 to the branch portion 25. At this time, a signal is also output from the area 22 to the branch portion 25.

With respect to each signal output to the branch portion 25, the sum of the signals output from the respective piezoelectric elements of each of the areas 21 and 22 is calculated in each of the operating portions 28 and 29, and the calculation results of the operating portions 28 and 29 is output to the comparator portion 31. For example, in the case of FIG. 7A, conceptually, signals are output from fifteen piezoelectric elements out of totally eighteen piezoelectric elements in the area 21, signals are output from four piezoelectric elements out of totally eighteen piezoelectric elements in the area 22, and no signal is output from the piezoelectric elements in the area 23. If it is assumed that each piezoelectric element outputs "1" if it is pushed and "0" if it is not pushed, "15" is output from the operating portion 28 to the comparator portion 31, "4" is output from the operating portion 29 to the comparator portion 31 and "0" is output from the operating portion 30 to the comparator portion 31.

In the comparator portion 31, the outputs from the respective operating portions are compared with one another, and a key controller for controlling an area which provides the largest output (largest numerical value) is driven. In this case, the calculation result ("15") based on the signal from the area 21 is largest, so that the key controller 32 equipped in connection with the area 21 is driven. At this time, the key controller 32 outputs to the CPU 24 a signal indicating that the area 21 is pushed. In response to this signal, the CPU 24 sets a call-origination allowable state.

Figure 6:
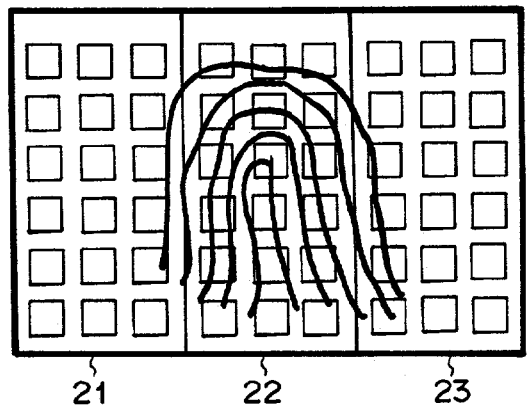
FIG. 6 is a diagram showing a fingerprint recognized by a fingerprint sensor when a finger is put at the center of the area 22 of FIG. 4.

Likewise, when the areas 23 and 22 are pushed in the styles as shown in FIG. 7B and FIG. 6, the CPU 24 is supplied a signal indicating that the area 23 is pushed and a signal indicating that the area 22 is pushed, and various menus are displayed on the display portion 6 or a telephone call is disconnected.

During a telephone call, voices emitted from the user are collected by the microphone 4, high frequency signals achieved by encoding and modulating the voice signal based on the voices thus collected is transmitted to a call partner side through the antenna 1 and a controlling base station. Further, during a telephone call, high-frequency signals transmitted from the call partner side through the base station, etc. is received by the antenna 1 and then voice signals based on electrical signals achieved by demodulating and combining the signals thus received are output from the speaker 5.

In place of the above procedure, the operation of the comparator portion 31 may be modified such that the signal (or the sum of the signals) output from a specific one piezoelectric element (or plural piezoelectric elements) around the center of each of the areas 21 to 23 or in the neighborhood of the edge portion of each of the areas 21 to 23 is compared among the areas 21 to 23 to quickly specify which key is pushed by the user.

Next, the operation when the cellular phone shown in FIG. 2 is used to purchase goods through the electronic commerce or to make a payment for purchased goods will be described.

First, a user registers the account number of his/her bank account to which a payment for the purchase price of goods or the like is charged and his/her fingerprint in a supply terminal which is operated by a supplier of goods or services in electronic commerce.

And then, For example when the user pushes the area 23 to select and determine a menu of "electronic commerce" from various menus displayed on the display portion 6, the cellular phone is connected to a network such as the Internet or the like through the controlling base station or the like.

Subsequently, when the user accesses, through an information service such as WWW (world wide web) or the like, a home page set up by a person who sales goods or the like on the Internet, a catalogue of various kinds of goods or the like is displayed on the display portion 6. The user selects his/her desired goods or the like from the catalogue thus displayed.

Subsequently, the supplier of goods or the like in the electronic commerce transmits a pre-registered user's bank account number, etc to the cellular phone. At this time, the account number, etc. are displayed in the cellular phone to promote the user to check whether the display content is correct or not. If the user transmits to the sales source (supplier) of the goods or the like in the electronic commerce a replay indicating that the display content is correct, an instruction of promoting the user to put his/her finger 42 on the fingerprint sensor 2 is transmitted from the supplier to the cellular phone.

When the user puts his/her finger 42 on the fingerprint sensor 2 in response to the instruction, signals from the fingerprint sensor 2 are encoded and modulated and then transmitted through the Internet to the supplier side of the goods, etc. in the electronic commerce. If the user's fingerprint thus transmitted is coincident with the fingerprint registered in the sales source, the purchase price of the goods or the like is paid from the bank account registered, and the purchased goods or the like will be delivered to the user by mail or the like.

On the other hand, if the fingerprint transmitted from the cellular phone is not coincident with the fingerprint registered at the supplier side of the goods or the like, the goods or the like would not be sold to the user, and this fact is transmitted to the cellular phone side. At this time, it is possible for the user to re-transmit his/her fingerprint to the supplier side of the goods or the like by using the fingerprint sensor 2. However, if the signal (fingerprint) re-transmitted is not coincident with the fingerprint registered at the supplier side in spite of repetitive transmission of the fingerprint to the supplier side at several times, the connection between the supplier side and the cellular phone is forcibly disconnected by the supplier side to keep the security.

Figure 8:
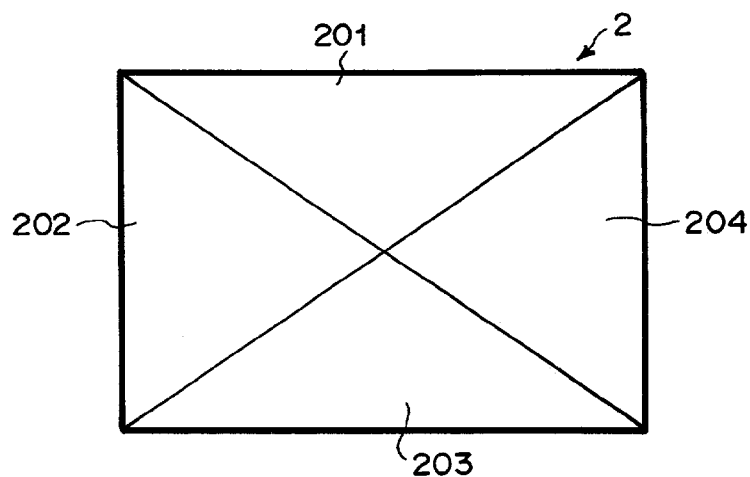
FIG. 8 is a diagram showing another embodiment of the fingerprint sensor of the cellular phone of FIG. 2.

In the above embodiment, the fingerprint sensor also serves as the key for inputting three instructions, for example. However, it may serve as a key for inputting four instructions as shown in FIG. 8, and it may serve as keys whose number corresponds to the size required to each key in connection with the miniaturization of the cellular phone.

As described above, according to the mobile radio terminal of the present invention, when the key lock is set, when goods or the like are purchased in the electronic commerce or when a payment for the purchase price of goods or the like is made, user's identity can be authenticated.

What is claimed is:

1. A mobile radio terminal comprising:
   a key which has a fingerprint detecting function and operates to input an instruction in correspondence with a push position;
   a memory for registering a fingerprint detected by said key;
   a fingerprint collating portion for collating the fingerprint registered in said memory with a fingerprint which is newly detected by said key;
   a detector for detecting an instruction, which is input on the basis of the push position of said key, when said key is pushed, wherein said push position is any one of a plurality of areas of said key and a particular instruction is inputted by pushing a corresponding one of said plurality of areas; and
   a switching portion for switching to allow the input of the instruction from said key only when it is determined through the fingerprint collation that the fingerprint newly detected is coincident with the fingerprint registered in the memory.

2. The mobile radio terminal as claimed in claim 1, wherein said key has plural cells or piezoelectric elements, and a fingerprint is detected on the basis of the level of a signal which is output in correspondence with unevenness of the fingerprint from each of said cells or each of said piezoelectric elements.

3. The mobile radio terminal as recited in claim 2, wherein said key has an area of at least 15 millimeters square.

4. The mobile radio terminal as claimed in claim 1, wherein said key has a light emitting element, and a fingerprint is detected on the basis of the reflection light of light irradiated from said light emitting element.

5. The mobile radio terminal as claimed in claim 1, wherein said key has an area of at least 15 millimeters square.

* * * * *